(12) United States Patent  
Lee

(10) Patent No.: US 8,578,996 B2  
(45) Date of Patent: Nov. 12, 2013

(54) METHOD AND APPARATUS FOR PRODUCING SINGLE YARN-ADHERED SHEET

(76) Inventor: Kyul-Joo Lee, Gyeonggi-do (KR)

( * ) Notice: Subject to any disclaimer, the term of this patent is extended or adjusted under 35 U.S.C. 154(b) by 343 days.

(21) Appl. No.: 12/942,737

(22) Filed: Nov. 9, 2010

(65) Prior Publication Data

US 2012/0085484 A1 Apr. 12, 2012

(51) Int. Cl.
*B32B 37/15* (2006.01)
*B32B 5/08* (2006.01)
*B29C 47/30* (2006.01)

(52) U.S. Cl.
USPC ........... 156/436; 156/498; 156/500; 156/167; 156/178

(58) Field of Classification Search
USPC .......................... 156/167, 178, 436, 498, 500
See application file for complete search history.

(56) References Cited

U.S. PATENT DOCUMENTS

| | | | | |
|---|---|---|---|---|
| 3,034,941 | A * | 5/1962 | Hessenthaler et al. | 428/43 |
| 6,799,680 | B2 * | 10/2004 | Mak | 206/524.8 |
| 6,969,441 | B2 * | 11/2005 | Welch et al. | 156/161 |

FOREIGN PATENT DOCUMENTS

| | | | |
|---|---|---|---|
| KR | 2001-0051892 A | | 6/2001 |
| KR | 2002-0068468 A | | 8/2002 |
| KR | 2003-0018274 A | * | 3/2003 |
| KR | 10-0465508 | | 1/2005 |
| WO | WO 02066227 A1 | | 8/2002 |

* cited by examiner

*Primary Examiner* — Michael Tolin
(74) *Attorney, Agent, or Firm* — Dority & Manning, P.A.

(57) ABSTRACT

In order to provide a sheet on which single yarns are densely adhered through a simple producing method and apparatus, and an improved channel with the same material, an apparatus for producing a sheet includes: a sheet supply roll supplying a sheet to a laminating roll; the laminating roll forming single yarns on the sheet supplied from the sheet supply roll; an extruder supplying a thermoplastic resin single yarn in a molten state to the sheet which passes the laminating roll through a nozzle; and a winding roll winding the sheet on which channels are formed by the single yarns attached to the sheet.

3 Claims, 8 Drawing Sheets

METHOD AND APPARATUS FOR PRODUCING SINGLE YARN-ADHERED SHEET

CROSS-REFERENCE TO RELATED APPLICATIONS

This application claims the priority of Korean Patent Application No. 10-2010-0097705 filed on Oct. 7, 2010 in the Korean Intellectual Property Office, the disclosure of which is incorporated herein by reference.

BACKGROUND OF THE INVENTION

1. Field of the Invention

The present invention relates to a single yarn-adhered sheet and a method and apparatus for producing the sheet, and more particularly, to a method and apparatus for producing a single yarn-adhered sheet on which dense channels are formed.

2. Description of the Related Art

Conventionally, food items including meat or processed meat products, which are required to be kept in storage for a long period of time, are put in a vacuum-available vinyl pack and vacuumized by using an air pump or other vacuum device, the inlet thereof is sealed, and the pack is then kept in storage.

In order to manufacture a vacuum packaging vinyl pack, Korean Laid Open Publication No. 2002-68468 discloses a method for forming embossed portions on one surface, and Korean Patent Registration No. 465508 discloses a method of adhering single yarns to a sheet.

The related art method of adhering single yarns to a sheet is illustrated in FIG. 1. In the related art, a general thermoplastic resin is inserted into a body 71 of an extruder 70 having a nozzle unit 72 with a plurality of extrusion holes 73 formed at regular intervals and extruded to directly produce single yarns 1, and the produced single yarns 1 are adhered to a sheet, thus integrating the process of producing the thermoplastic resin single yarn and the process of producing the sheet.

In detail, as shown in FIG. 1, thermoplastic resin single yarns 1 output from the extruder 70 are transferred to an upper laminating roll 22 through a single yarn roll 80 having supply recesses 81 formed at regular intervals thereon and a guide roll 10 having guide recesses 11 formed therein, and in this case, because the thermoplastic resin single yarns 1 extruded by the extruder 70 are in a molten state, the single yarns 1 are solidified through the single yarn supply roll 80 having a cooling effect, and then transferred to the guide roll 10. The thermoplastic resin single yarns 1, with an outer surface thereof slightly melted by a heater 4, are adhered to and compressed with a sheet 2, which has been transferred to a lower laminating roll 21 after being supplied from a sheet supply roll 30, by a laminating roll 20 to form a vacuum packaging sheet 3 having a channel layer in which the single yarns 1 and the sheet 2 are adhered. The adhered sheet 3 is wound on and around a winding roll 60 through a cooling roll 50 so as to be completed as a sheet having single yarn protrusions.

FIG. 2 is a bottom perspective view of the extruder of the apparatus for producing a single yarn-adhered sheet according to the related art as illustrated in FIG. 1. The extruder 70 includes the body 71 storing a general thermoplastic resin and the nozzle 72 part formed at a lower end portion of the body 71 and having a plurality of extrusion holes 73 formed at regular intervals therein. With the resin existing in a molten state in the body 71 of the extruder 70, the plurality of synthetic resin single yarns 1 are extruded from the extrusion holes 73 of the nozzle unit 72.

However, the related art has a problem in that because the producing of the single yarn and the adhering of the single yarn are performed separately, the producing method and the producing apparatus are complicated and an additional heating operation must be performed.

In addition, as shown in FIG. 3, the diameter (D) of the resin extruded from the extrusion hole 73 extends as it is adhered to the single yarn supply roll 80 and rotated, and as a result, the resin having the extended diameter (d) is adhered to the single yarn supply roll 80.

Thus, because the diameter (d) of the adhered single yarn is smaller than the diameter (D) of the resin from the extrusion hole 73, the intervals between the extrusion holes 73 become wider when the resin is adhered to the single yarn supply roll 80. In particular, a certain distance needs to be maintained between the extrusion holes 73 to prevent the resin from being attached at an initial stage, having a limitation in narrowing the interval between the single yarns. In addition, when the sheet obtained with the intervals between single yarns not sufficiently narrowed is formed as a vacuum vinyl pack, a vacuum suction is not smoothly performed, and this problem is an obstacle to the related art in being put into practical use.

SUMMARY OF THE INVENTION

An aspect of the present invention provides a sheet on which single yarns are densely adhered through a simple producing method and apparatus.

Another aspect of the present invention provides an improved channel with the same material.

According to an aspect of the present invention, there is provided an apparatus for producing a sheet, including: a sheet supply roll supplying a sheet to a laminating roll; the laminating roll forming single yarns on the sheet supplied from the sheet supply roll; an extruder supplying thermoplastic resin single yarns in a molten state to the sheet which passes the laminating roll through a nozzle; and a winding roll winding the sheet on which channels are formed by the single yarns attached to the sheet.

A plurality of single yarn extrusion holes may be formed in a plurality of rows at certain intervals on the nozzle, and in this case, the single yarn extrusion holes of a row thereof and the other row thereof may be disposed in a alternating manner.

The single yarn extrusion holes of the nozzle may be formed on a slope face of the nozzle and extrude the single yarn in a direction perpendicular to the slope face.

The laminating roll may be a cooling roll.

The distance between an end of the single yarn extrusion hole and that of a neighbor single yarn extrusion hole may exceed 0.7 mm.

The diameter of the single yarn extrusion hole may range from 0.2 mm to 3.0 mm.

The apparatus may further include: a pressing member disposed at a position and pressing the single yarns after the single yarns from the extruder from the laminating roll is adhered on the sheet.

According to another aspect of the present invention, there is provided a method for producing a sheet, including: supplying a sheet from a sheet supply roll to a laminating roll; adhering thermoplastic resin single yarns, which have been melted and extruded from the extruder, to the sheet which has been supplied to the laminating roll; and cooling the single yarn-adhered sheet and winding the same.

In the adhering of the thermoplastic resin single yarns with the laminating roll in the extruder, the resin is extruded in a alternating manner from a plurality of single yarn extrusion holes in a plurality of rows in the extruder.

The adhering of the single yarn to the sheet and the cooling of the single yarn-adhered sheet may be simultaneously performed.

The nozzle may be supplied to the sheet at a certain angle in a gravity direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
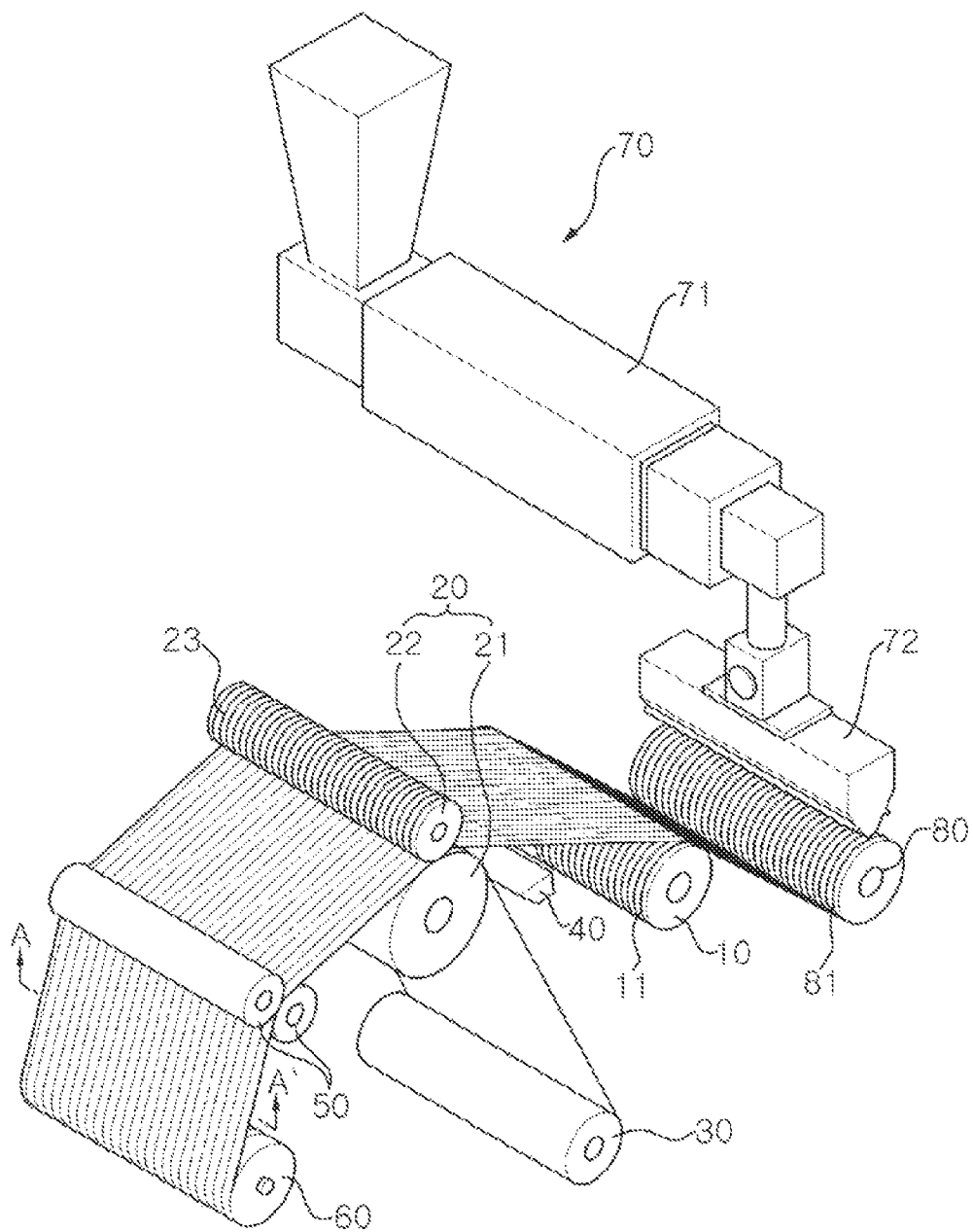
FIG. 1 is a perspective view of an apparatus for producing a single yarn-adhered sheet according to the related art.
Figure 2:
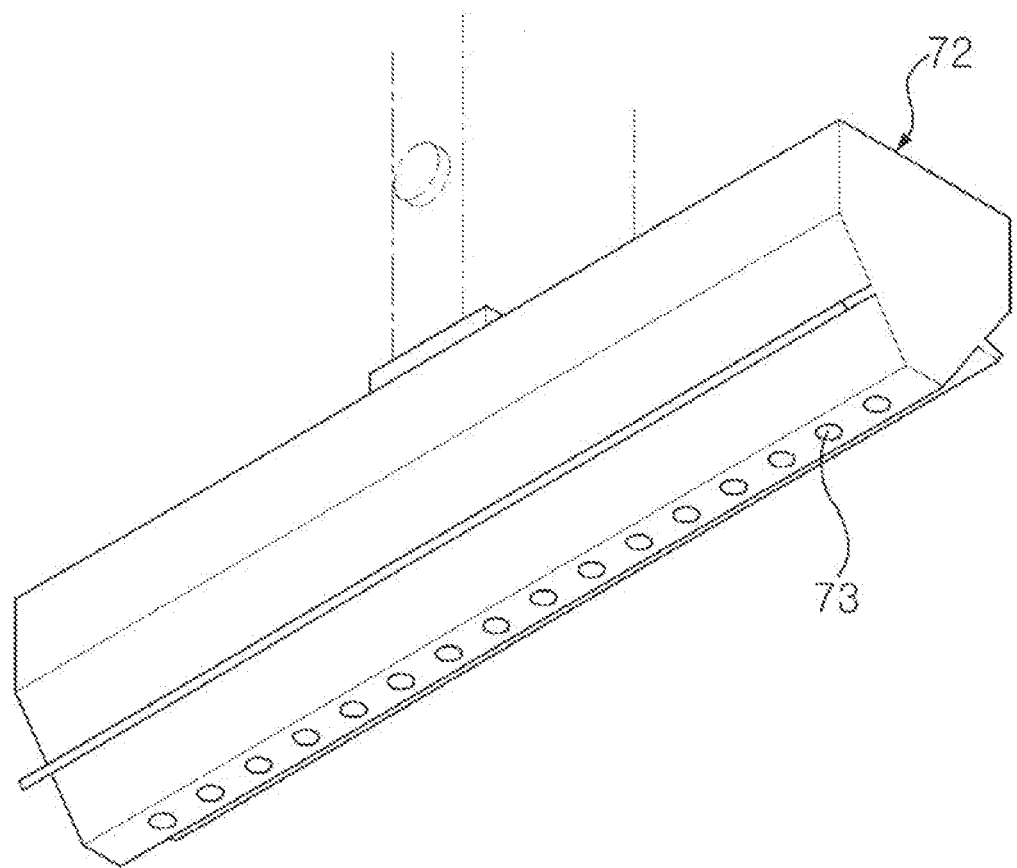
FIG. 2 is a bottom perspective view of a nozzle unit of the apparatus for producing a single yarn-adhered sheet according to the related art.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 4:
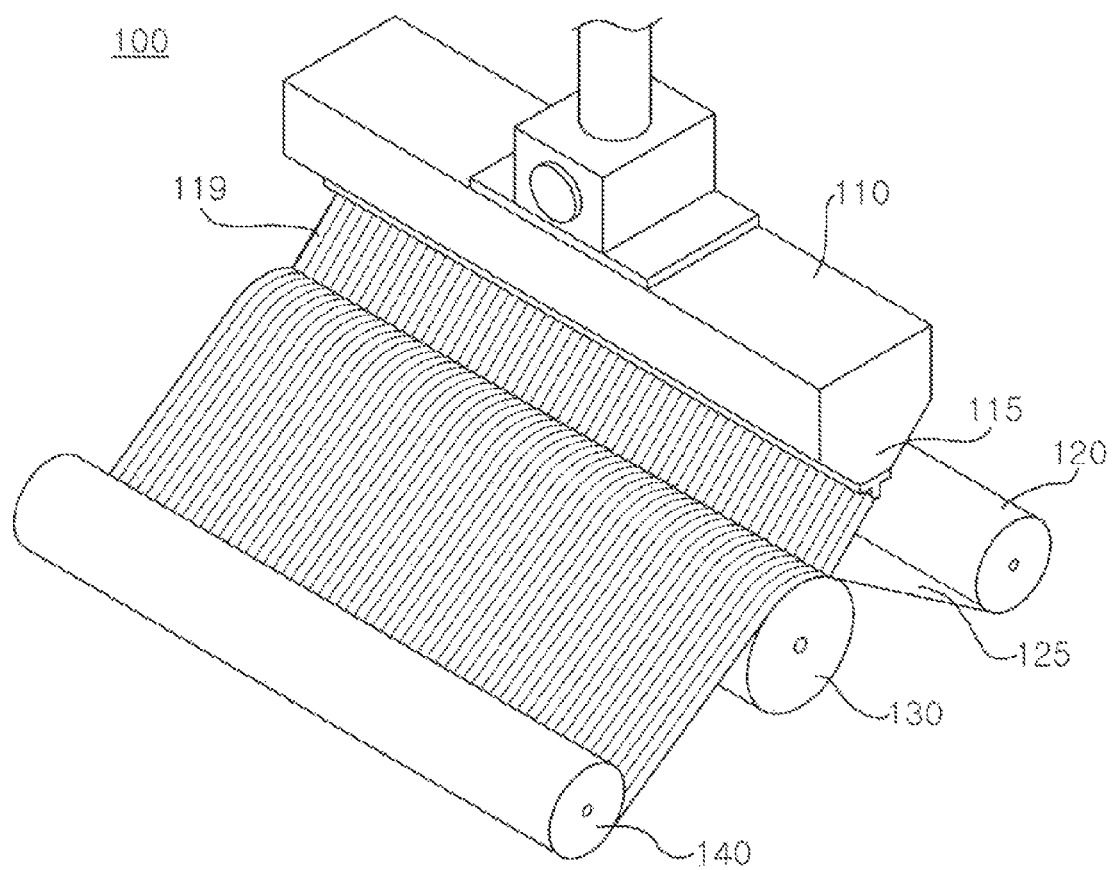
FIG. 4 is a perspective view of an apparatus for producing a single yarn-adhered sheet according to an exemplary embodiment of the present invention.

FIG. 4 is a perspective view of an apparatus for producing a single yarn-adhered sheet according to an exemplary embodiment of the present invention.

As shown in FIG. 4, an apparatus 100 for producing a single yarn-adhered sheet, adheres single yarns 119, which have been supplied through a nozzle 115 of a nozzle unit 110, to a sheet 125 supplied from a sheet supply roll 120 by a laminating roll 130, and the sheet to which the single yarns 119 are adhered is wound by a winding roll 140.

The laminating roll 130, to which cooling water is supplied, serves as a cooling roll, and accordingly, the single yarns 119 supplied with a resin material melted from the nozzle 115 are solidified while passing through the laminating roll 130. In the present exemplary embodiment, the laminating roll 130 is illustrated as serving as a cooling roll, but the present invention is not limited thereto and a cooling roll may be disposed between the laminating roll 130 and the winding roll 140 and the single yarns of the single yarn-adhered sheet may be solidified by the cooling roll and then wound by the winding roll 140.

In the present exemplary embodiment, the single yarns 119 are adhered to the sheet 125 immediately after they are extracted, rather than being separately produced and then adhered to the sheet 125, so the process and the apparatus are therefore simple. Also, unlike the related art pattern forming method, channels are formed on the sheet 125 through the single yarns 119, the material cannot be wasted on the bottom of the channels, thus preventing an unnecessary waste of raw materials and forming the channels higher than those of the related art.

Figure 5:
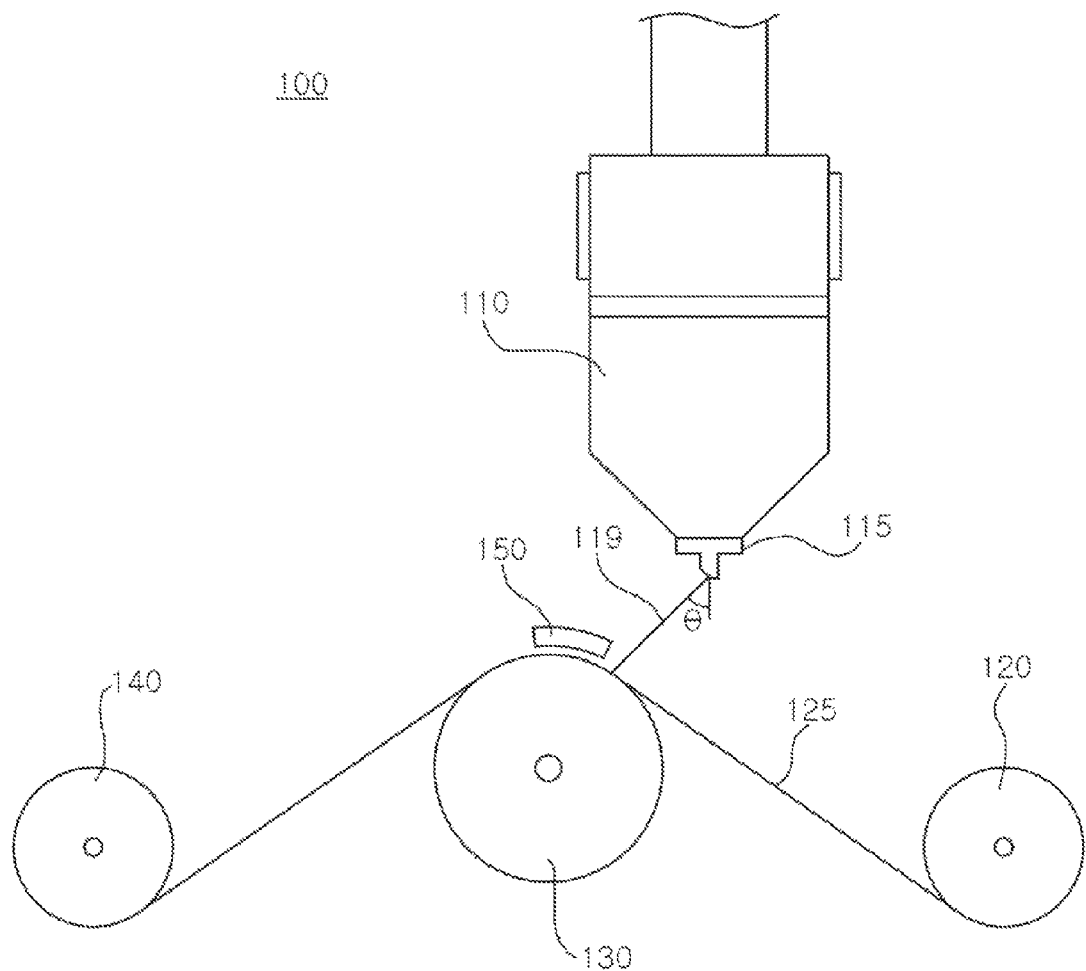
FIG. 5 is a sectional view of the apparatus for producing a single yarn-adhered sheet according to an exemplary embodiment of the present invention.

FIG. 5 is a sectional view of the apparatus for producing a single yarn-adhered sheet according to an exemplary embodiment of the present invention. As shown in FIG. 5, the nozzle unit 110 is positioned at a upper right side of the laminating roll 130, and accordingly, the nozzle 115 of the nozzle unit 110 extrudes a thermoplastic resin in a slope direction, rather than in a gravity direction, whereby the resin is extruded in a direction in which the laminating roll 130 proceeds. A slope angle (θ) for extruding the resin may be approximately 45 degrees, but the present invention is not limited thereto and the slope angle may vary depending on a rotation speed of the laminating roll 130 and an extrusion speed at the nozzle unit 110.

The nozzle 115 is detachably attached to the nozzle unit 110. Thus, single yarns can be injected according to different methods by simply replacing the nozzle 115, and when the nozzle 115 is contaminated, the nozzle 115 may be detached from the nozzle unit 110 and cleansed. A detailed configuration of the nozzle 115 will be described in detail later.

A pressing member 150 may be disposed at a position of the laminating roll 130 to press the single yarns 119 to the sheet 125, which has been adhered to the sheet 125 by the laminating roll 130 after being extruded from the nozzle unit 110, to thereby ensure a reliable adhesion of the single yarns 119 to the sheet 125. Because the pressing member 150 presses the single yarns 119 to the sheet 125, an adhesive force between the single yarns 119 and the sheet 125 can be further increased. In this case, if the single yarns 119 are excessively pressed by the pressing member 150, the channels between the single yarns 119 may be damaged, and thus preferably, the pressing member 150 presses the single yarns 119 to a certain distance from the sheet 115, e.g., as high as a desired height of the channels. Also, preferably, the pressing member 150 presses the single yarns 119 before the single yarns 119 are completely cooled.

Figure 6:
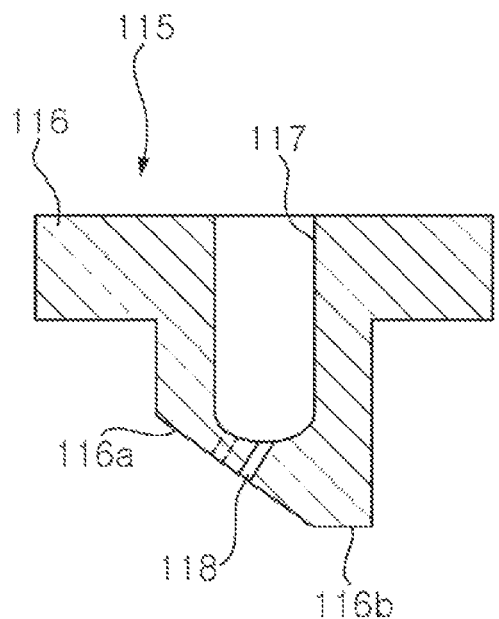
FIG. 6 is a sectional view of a nozzle unit of the apparatus for producing a single yarn-adhered sheet according to an exemplary embodiment of the present invention.

FIG. 6 is a sectional view of the nozzle 115. As shown in FIG. 6, an inlet 117 is formed in the interior of the nozzle 115, through which the thermoplastic resin melted in the interior of the nozzle unit 110 is supplied to the nozzle 115. An extrusion hole 118 is formed at a lower portion of the inlet 117. The molten thermoplastic resin is supplied to the laminating roll 130 through the extrusion hole 118 of the nozzle 115.

A central frame 116 of the nozzle 115 includes a slope face 116a and a horizontal face 116b, and the extrusion hole 118 is formed to communicate with the inlet 117. The extrusion hole 118 is formed to be perpendicular to the slope face 115a, so the thermoplastic resin is extruded from the extrusion hole 118 at the slope angle (θ) in a gravity direction.

Figure 7:
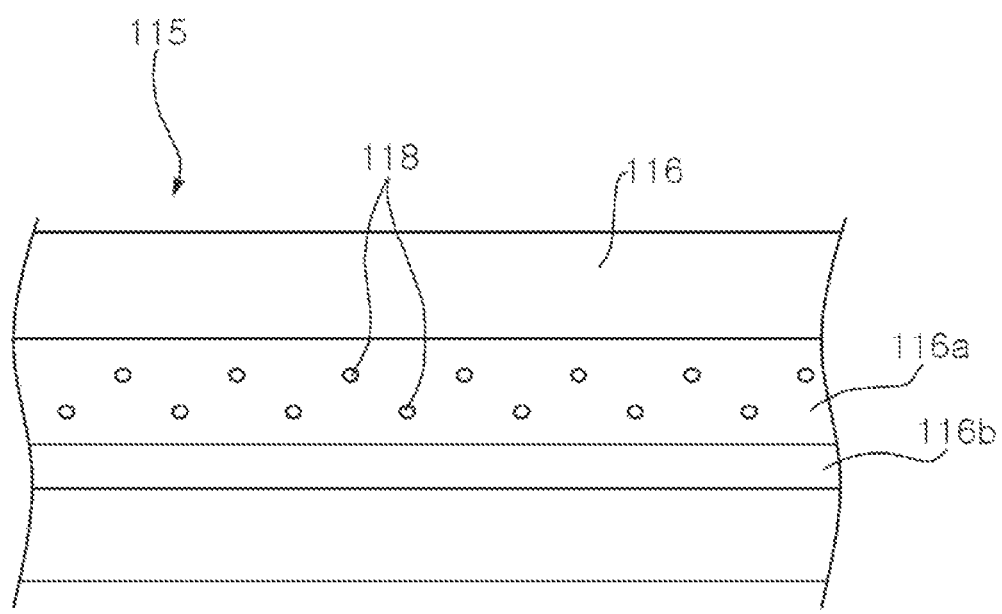
FIG. 7 is a bottom view of the nozzle unit of the apparatus for producing a single yarn-adhered sheet according to an exemplary embodiment of the present invention.

FIG. 7 is a bottom view of the nozzle unit of the apparatus for producing a single yarn-adhered sheet according to an exemplary embodiment of the present invention. As shown in FIG. 7, a plurality of extrusion holes 118 are disposed in two rows on a slope face 116a of the nozzle 115, and the extrusion holes 118 of the respective rows are spaced apart, and the extrusion holes of a row thereof and the other row thereof are disposed to be alternated in a horizontal direction.

Figure 8:
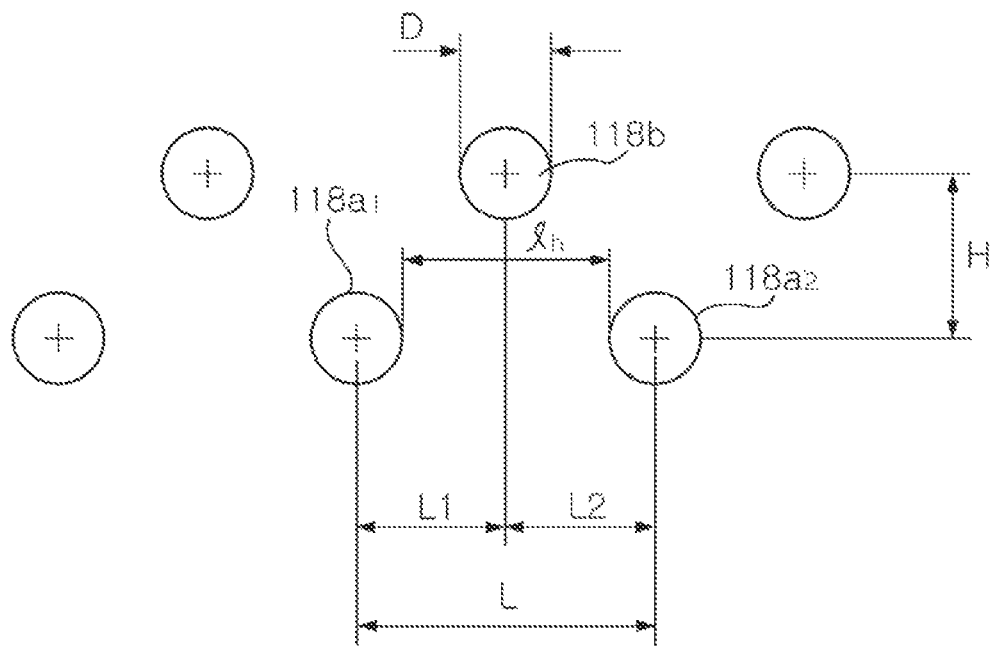
FIG. 8 is a layout view of extrusion holes of the apparatus for producing a single yarn-adhered sheet according to an exemplary embodiment of the present invention.

FIG. 8 illustrates the plurality of extrusion holes 118 disposed on the slope face 116a of the nozzle 115.

As shown in FIG. 8, the extrusion holes 118 are disposed in a plurality of rows, e.g., in two rows. The extrusion holes in the upper and lower rows are spaced apart by a distance (H), and the extrusion holes in the respective rows are spaced apart such that the distance between the centers of the respective extrusion holes 118 is L.

Meanwhile, the extrusion holes 118b of the upper row and the extrusion holes 118a1 and 118a2 of the lower row are disposed to be alternated. When viewed in the horizontal direction, the extrusion hole 118b of the upper row is positioned at a central position between the extrusion holes 118a1 and 118a2 of the lower row (L1=L2), respectively. However, differently, if necessary, a horizontal distance L1 between the extrusion hole 118b of the upper low and the extrusion hole 118a1 of the lower low may not be equal to the horizontal distance L2 between the extrusion hole 118b of the upper low and the extrusion hole 118b1 of the lower low. Namely, the distance L1 may be greater than the distance L2.

The center of the extrusion hole 118b of the upper row has the distances L1 and L2 in the horizontal direction based on the center of each of the extrusion holes 118a1 and 118a2 of the lower row, so the distance between the center of the extrusion hole 118b of the upper row and the center of the extrusion hole 118a1 of the lower row can be obtained as represented by Equation 1 shown below:

$$\sqrt{H^2 + L1^2}$$ [Equation 1]

Because the extrusion holes 118a1, 118a2, and 118b of the upper row and the lower row are affected by the distance (H) between the rows, although the horizontal distance L1 and L2 become narrow, the distance between the extrusion holes 118a1, 118a2, and 118b of the upper row and the lower row can be regulated by adjusting the distance (H) between the rows.

Figure 3:
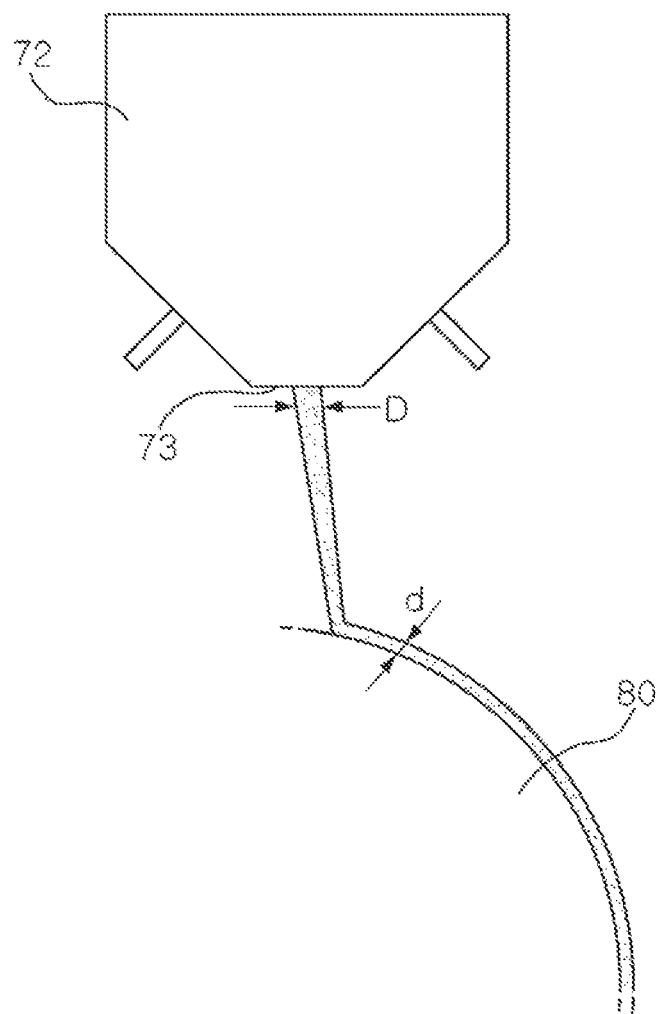
FIG. 3 is a view showing a state in which the single yarn is adhered to a single yarn supply roll according to the related art.

As described above with respect to the related art, in order to prevent resin from being adhered in a molten state in an initial stage, the distance between the extrusion holes must be maintained. The distance (L) between the centers of the extrusion holes and the distance (L) between the centers of the single yarns are equal, but an actual distance ($l_h$) between the extrusion holes or the distance between the single yarns is equivalent to a distance obtained by subtracting the diameter (D) of the extrusion hole from the distance (L) between the centers or the diameter (d) between the single yarns ($l_h$=L−D, $l_{y1}$=L1−d). The resin coming from the extrusion holes 118 is adhered to the single yarns and oriented by the laminating roll 130. Thus, when the single yarns are wound on the roll, the diameter (d) of the single yarns is smaller than the initial diameter (D) of the extrusion hole (See FIG. 3), and accordingly, the distance between the single yarns becomes longer than the distance between the extrusion holes.

This means that so long as the resin strands extruded from the extrusion holes 118 are not adhered to each other at the initial stage, there is no possibility that the single yarns or the resin strands are adhered to each other when the resin is adhered to the laminating roll 130 afterward. In the present exemplary embodiment, the extrusion holes 118 are disposed to be alternated in a plurality of rows. Thus, one extrusion hole 118b can be generated between the distance (L) the centers or between the distance ($l_h$) between the extrusion holes for preventing the resin strands extruded through the initial extrusion hole 118 from being adhered to each other between the extrusion holes 118a1 and 118a2 of one row.

In the present exemplary embodiment, resins extruded through the initial extrusion hole 118 can be prevented from being adhered to each other, and dense single yarns 119 can be formed, whereby the channels can be more densely formed on the product. Also, when the single yarns 119 are formed at the same intervals, because there is no possibility that the resins are adhered to each other at the initial stage, the single yarns can be more quickly adhered to the sheet compared with the related art producing apparatus.

In addition, the distance (H) between the rows serves to widen the distance between the initial extrusion holes 118, and when the single yarns are adhered to the sheet, the distance (H) merely makes a difference in a lengthwise direction of the single yarns in the initial stage. Thus, when the single yarns are adhered to the roll continuously, the distance (H) does not affect the disposition of the single yarns, so it advantageously narrows the distance between the single yarns.

Also, because the resin is extruded to be sloped with relation to the laminating roll 130, namely, the resin is extruded in a direction in which the laminating roll 130 rotates, the distance (H) between the rows does not affect the disposition of the single yarns, and in addition, because the movement of the resin adhered to the laminating roll 130, possibly made according to the rotation of the laminating roll 130, can be minimized to thus minimize the adhesion between the resins before being adhered to the laminating roll 130.

Figure 9:
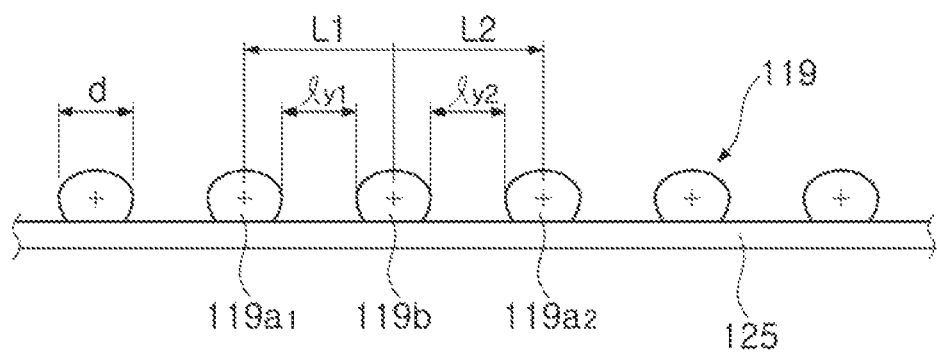
FIG. 9 is a sectional view of an apparatus for producing a single yarn-adhered sheet according to another exemplary embodiment of the present invention.

FIG. 9 is a sectional view of the sheet 125 to which the single yarns 119 adhered after being generated by the nozzle 115 having the extrusion holes 118. As shown in FIG. 9, the adhered single yarns 119 include the single yarn 119b extruded from the extrusion hole 118b between the single yarn 119a1 extruded from the extrusion hole 118a1 and adhered to the sheet 125 and the single yarn 119a2 extruded from the extrusion hole 118a2 and adhered to the sheet 125.

Thus, because the single yarn is additionally disposed between the related art distance $l_h$ between the single yarns, the distance between the single yarns can be remarkably reduced, and the single yarns can be stably prevented from being adhered to each other at the distance between the single yarns as in the related art.

In particular, in the related art, when the distance $l_h$ between the extrusion holes 118 is 0.7 mm or smaller, the resin strands are adhered to each other in the extrusion holes 118. Thus, the distance $l_h$ between the extrusion holes 118 must exceed 0.7 mm in the related art.

However, in an exemplary embodiment of the present invention, because one extrusion hole is additionally disposed therebetween, single yarns can be formed at an interval of 0.2 mm between the single yarns. Namely, the distance ($l_{y1}$, $l_{y2}$) between single yarns can be as short as 0.2 mm.

Meanwhile, preferably, the diameter of the extrusion hole 118 ranges from 0.2 mm to 3.0 mm. In detail, in order for the resin to be melted and extruded from the nozzle unit 110, the diameter of the extrusion hole 118 must be 0.2 mm or greater, and in order for the single yarns to be completely cooled by the cooling roll or a cooling device before being wound on or around the winding roll 140, the diameter of the extrusion hole 118 must be 3.0 mm or smaller. If the single yarns are wound on the winding roll 140 before being cooled, the shape of the single yarns 119 is pressed to make it difficult to form channels.

Figure 10:
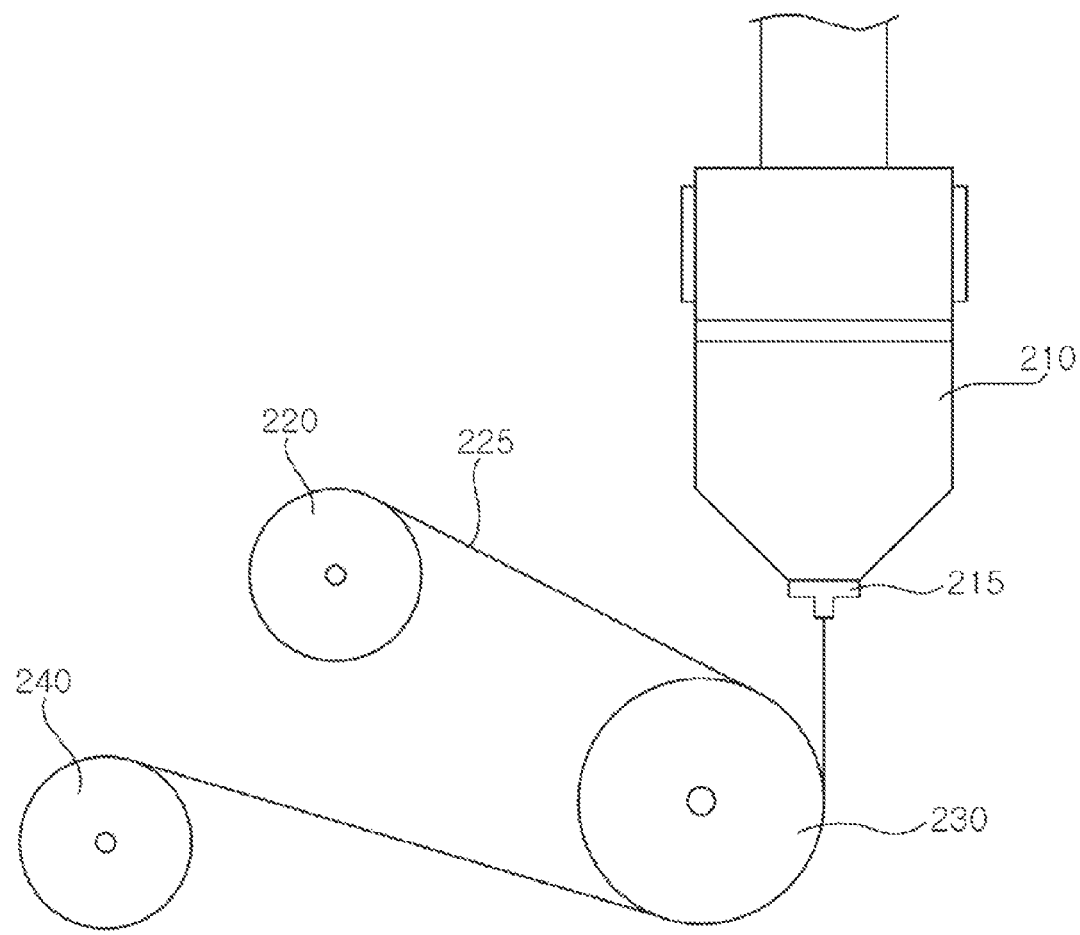
FIG. 10 is a sectional view of a single yarn-adhered sheet produced by the apparatus for producing a single yarn-adhered sheet according to an exemplary embodiment of the present invention.

FIG. 10 shows another example of the present invention. As shown in FIG. 10, single yarns 119 supplied through a nozzle 215 of a nozzle unit 210 are adhered to a sheet 225 supplied from a sheet supply roll 220 by a laminating roll 230, and the single yarn-adhered sheet is wound on or around a winding roll 240.

The laminating roll 230, to which cooling water is supplied thereinto, serves as a cooling roll, and accordingly, the single yarns 119 supplied with a resin material melted from the nozzle 215 is solidified while passing through the laminating roll 230. In the present exemplary embodiment, the laminating roll 230 is illustrated to serve as a cooling roll, but the present invention is not limited thereto and a cooling roll may be disposed between the laminating roll 230 and the winding roll 240 and the single yarns of the single yarn-adhered sheet may be solidified by the cooling roll and then wound by the winding roll 240.

In the present exemplary embodiment, the nozzle 215 does not have a slope face 116a such as that of the former exemplary embodiment, and the resin is extruded from the nozzle 215 in a gravity direction, rather than in the direction sloping to the laminating roll.

In the present exemplary embodiment, the resin extruded from the nozzle 215 is disposed to be supplied in a rotational direction of the laminating roll 230, namely, an adhesion line of a point where the resin is adhered to the laminating roll is substantially in a gravity direction. Thus, the rotation of the laminating roll is only related to the orientation of the resin, without changing the direction of the resin, and thus, the resins are not adhered to each other.

As set forth above, according to exemplary embodiments of the invention, a sheet on which single yarns are densely adhered can be provided through the simple producing method and apparatus.

In addition, an improved channel can be formed with the same material.

While the present invention has been shown and described in connection with aforementioned exemplary embodiments, it will be apparent to those skilled in the art that modifications and variations can be made without departing from the spirit and scope of the invention as defined by the appended claims.

What is claimed is:

1. An apparatus for producing a sheet, the apparatus comprising a sheet supply roll, a laminating roll and a winding roll arranged sequentially in a sheet transferring direction;
    wherein the apparatus further comprises an extruder disposed above the laminating roll, the extruder including a nozzle for extruding thermoplastic resin single yarns in a molten state, the apparatus further comprising a pressing member for pressing the single arms extruded from the extruder,
    the sheet supply roll supplies a sheet to the laminating roll,
    the laminating roll is arranged so that the sheet is transferred by a surface of the laminating roll,
    the extruder is arranged so as to extrude the thermoplastic resin single yarns directly to the sheet transferred by the surface of the laminating roll,
    the laminating roll has cooling water supplied thereto for cooling the thermoplastic resin single yarns extruded to the sheet,
    with respect to the laminating roll, the pressing member is disposed in a position spaced apart from a position in which the thermoplastic resin single yarns are attached to the sheet, in the sheet transferring direction, to press the thermoplastic resin single yarns to the laminating roll before the single yarns are completely cooled,
    the nozzle comprises a plurality of single yarn extrusion holes formed on a sloped face of the nozzle in a direction perpendicular thereto, and
    the plurality of single yarn extrusion holes are formed in a plurality of rows spaced apart at a certain interval on the nozzle, and the extrusion holes of one row thereof and other rows thereof are disposed to be off-set in a horizontal direction.

2. The apparatus of claim 1, wherein the distance between an end of a single yarn extrusion hole and that of an adjacent single yarn extrusion hole exceeds 0.7 mm.

3. The apparatus of claim 1, wherein the diameter of a single yarn extrusion hole ranges from 0.2 mm to 3.0 mm.

* * * * *